April 9, 1963

A. SALZER 3,084,905

WATER POWER CONVERSION SYSTEM

Filed April 7, 1960

INVENTOR.
ALEXANDER SALZER
BY
ATTORNEY

April 9, 1963

A. SALZER 3,084,905

WATER POWER CONVERSION SYSTEM

Filed April 7, 1960

INVENTOR.
ALEXANDER SALZER
BY
ATTORNEY

INVENTOR.
BY ALEXANDER SALZER
ATTORNEY

April 9, 1963

A. SALZER 3,084,905

WATER POWER CONVERSION SYSTEM

Filed April 7, 1960

INVENTOR.
ALEXANDER SALZER
BY
ATTORNEY

United States Patent Office 3,084,905
Patented Apr. 9, 1963

3,084,905
WATER POWER CONVERSION SYSTEM
Alexander Salzer, 705 E. 6th St., New York, N.Y.
Filed Apr. 7, 1960, Ser. No. 20,707
4 Claims. (Cl. 253—18)

According to the invention there is provided a plurality of rows and files of water tanks. The rows extend transversely and are on different levels with the tanks in each row of the same height. The files extend longitudinally and each file of tanks includes one tank in each row located on successive descending levels. The successive tanks in each file are connected so that an outlet is provided from one tank to an inlet of the next in descending order in the file. Each tank has a float supporting a rack gear and the rack gears of each row drive a shaft. The shafts in the several rows drive a master power take-off shaft and flywheel. The floats in the tanks of each row are on different levels and phased so that each rack gear and float are at a different point in their cycle of ascent and descent, so that half of the floats are always in some stage of shaft driving ascent and the other half are in some stage of free descent. The composite effect is analogous to that obtained in a multiple chamber internal combustion engine having a predetermined firing order for driving its several pistons all operatively connected to drive the main shaft of the engine.

It is therefore a principal object of the invention to provide an array of water tanks including a plurality of rows and files of tanks having floats all operatively arranged to drive a mechanical power take-off shaft, and wherein all the floats are phased so as to be located at a different point in their cycles of ascent and descent in the tanks.

Another object is to provide a motor driven by water of a stream such as a river, so designed that a plurality of like mechanisms, all drivingly related to a single shaft, will be arranged to operate in successive sequence, to drive the shaft and effect a constant rotary motion of the shaft at a substantially constant speed.

Still another object is to provide in a mechanism of the type stated, a float-operated vertically reciprocating rack adapted for rotating a shaft, the movement of the float being controlled by switch-actuated valves.

In the accompanying drawings forming a material part of this disclosure:

Figure 1:
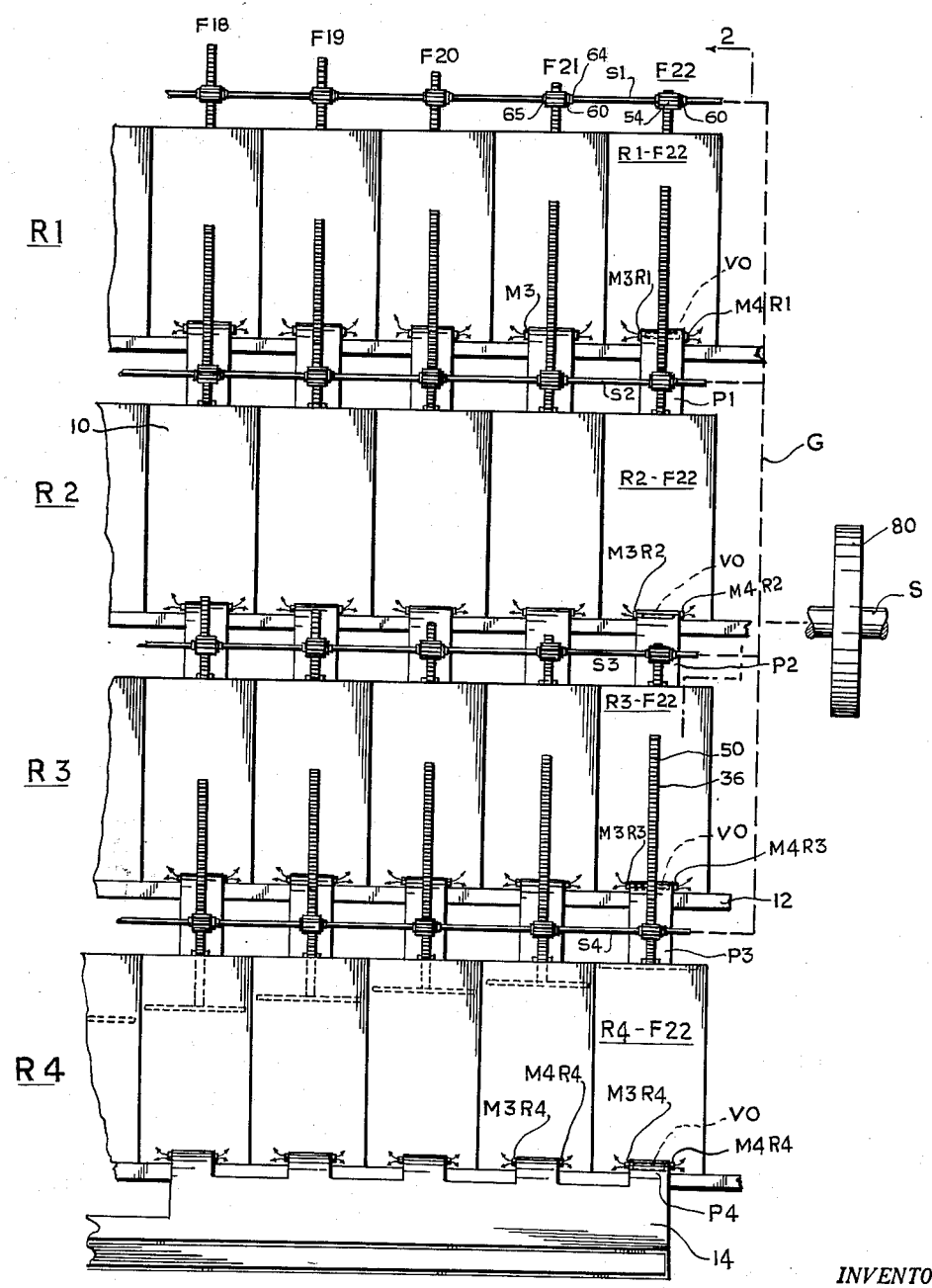
FIG. 1 is a front elevational view of part of an assembly of tanks according to the invention.
Figure 2:
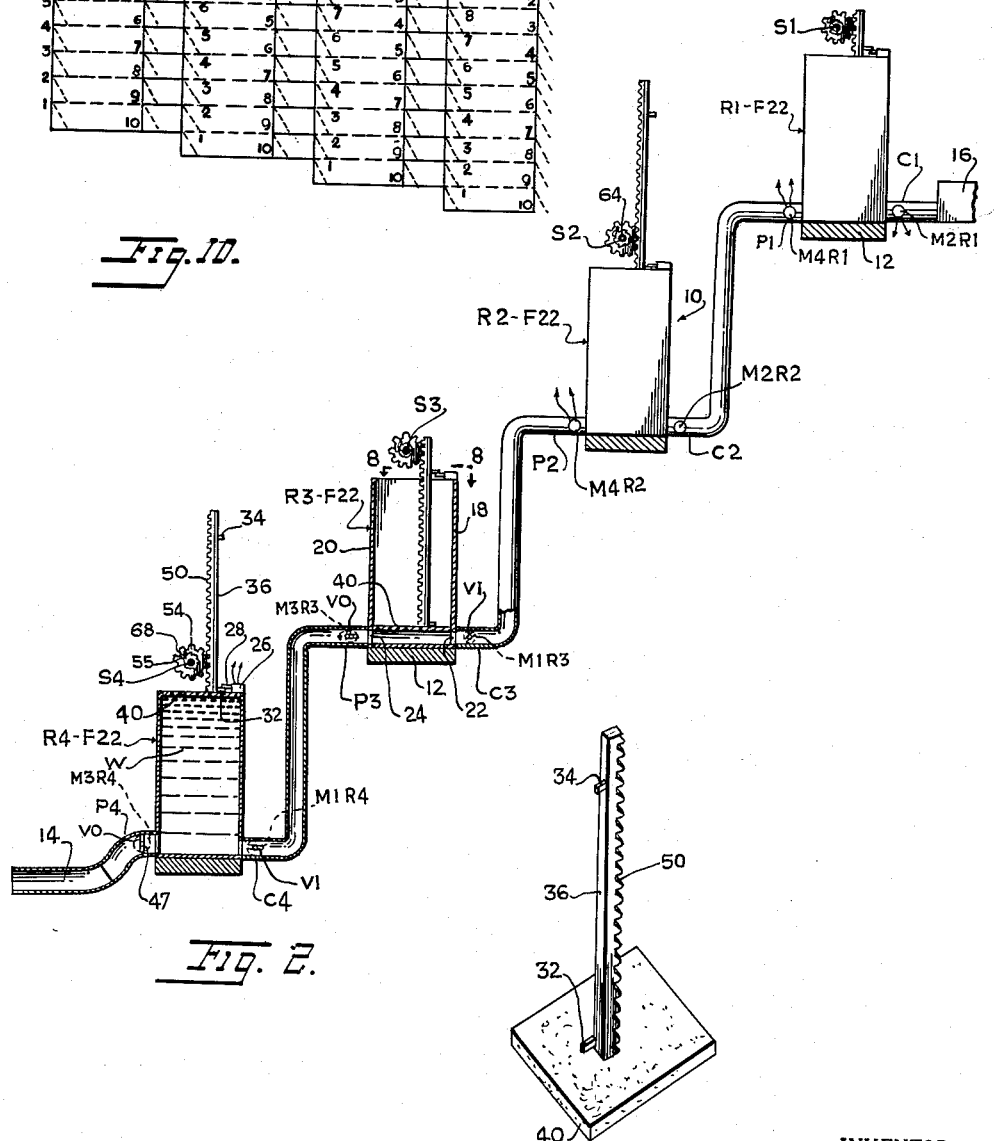
FIG. 2 is a side elevational view partially in section of part of the assembly of tanks, taken on line 2—2 of FIG. 1.
Figure 5:
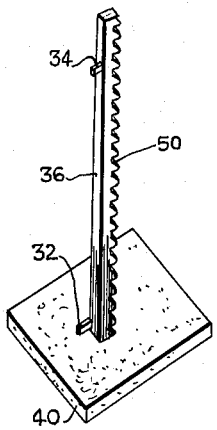
FIG. 5 is a perspective view of a float and rack gear.

Referring to the drawings, the system includes an array of tanks 10. There are preferably twenty-two tanks in each of four transverse rows R1–R4 as indicated diagrammatically in FIG. 6. Two of the tanks are shown empty, leaving twenty tanks with water in them. The tanks are further arranged in longitudinal files F1–F22. Any tank can thus be designated by its row and file. Thus, tank R4—F22 is the tank in the fourth row on the extreme right as shown in FIGS. 1 and 2. The rows are located on different levels in successive descending order from row R1 to R4, with the tanks in each row all on the same level.

The tanks are rectangular in cross section and may be supported on beams or planks 12 in a suitable framework to form a stationary rigid support for all the tanks in the array. Each tank has an inlet conduit C1–C4 and an outlet conduit P1–P4 communicating with openings 22 and 24, respectively in the several tanks. The outlets P4 are all connected into a common outlet conduit 14. Inlets C1 may all be connected to a single common inlet conduit 16, indicated in FIG. 2. Outlets P1, P2, P3 are continuous with inlets C2, C3, C4.

The inlets C1–C4 are all connected to individual rear or upstream walls 18. The outlets P1–P4 are all connected to individual front or downstream walls 20.

All the tanks and all the "inlets and outlets" in each tank are of the same size. The more tanks and the more "inlets and outlets," the larger the size of the lifting surface and the more power there is for turning generators, driving pumps or other machines.

The rows of tanks are so arranged that the top of the first line of tanks is one "inlet or outlet" higher than the top of the second row of tanks. The top of the second row is one "inlet or outlet" higher than the top of the third row. Each succeeding line of tanks is one "inlet or outlet" lower than the previous line.

The advantage of this method is that instead of having only one lifting surface for each height of tanks, there are many more lifting surfaces for each height of tank, but using the same water many times and creating much more power for use.

Figure 10:
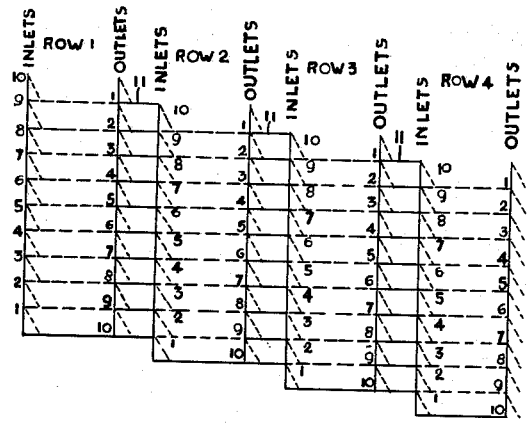
FIG. 10 is a diagrammatic view showing the gutter connections between the tanks in the upper row with the tanks in the next adjacent lower row.

Referring to FIG. 10, there is one gutter indicated at 11 connecting the bottoms of all the top or No. 1 outlets in row 1 with the tops of all No. 10 inlets in the next adjacent lower row No. 2, and a single gutter connecting the bottoms of all No. 2 outlets with the tops of all No. 9 inlets in the second row. Rows 2 and 3 and 3 and 4 are similarly connected. This system is used to connect the bottoms of all the outlets with the tops of all corresponding inlets in the next lower row of tanks.

On the top of each rear wall is mounted a switch box 26 having two movable arms 28, 30 horizontally spaced for actuation by vertically and horizontally spaced projections 32, 34 respectively, on rack gears 36, the lower projection 32 actuating arm 28 when the gear is in uppermost position and upper projection 34 actuating arm 30 when the rack gear is in a lowermost position or by mechanical means to open or close the "in and outlets."

Figure 7:
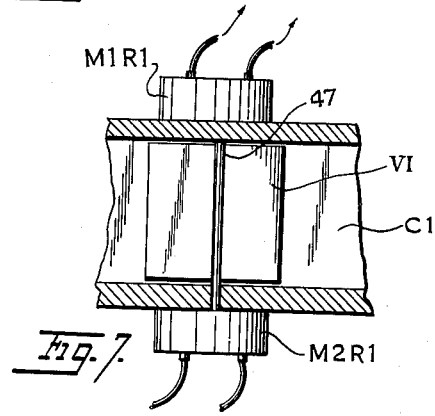
FIG. 7 is a fragmentary horizontal section on an enlarged scale through one of the water conduits of the system.
Figure 8:
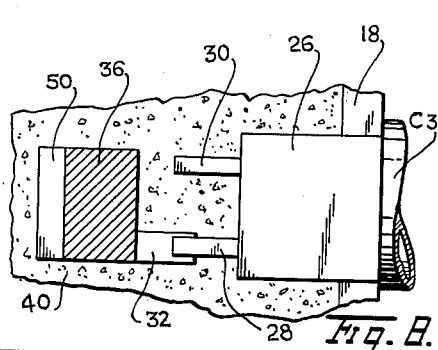
FIG. 8 is a fragmentary horizontal sectional view on an enlarged scale taken on line 8—8 of FIG. 2.

Each rack gear is supported by a rectangular float 40 made of cork, wood, foam plastic, or other buoyant material. The float 40 is loosely fitted in the tank and moves readily up or down as the water level changes. In order to control the flow of water into and out of each tank, there are provided butterfly valves VI and VO; see FIGS. 1, 2 and 7. These valves are electrically operated. Each valve has a shaft 47 journaled to rotate in the opposite side walls of the inlet or outlet conduit in which it is mounted. Each valve shaft 47 is connected to two motors at opposite ends for opening and closing the valve. At the inlets of the tanks, motors M1R1, M1R2, M1R3 and M1R4 open the inlet control valves VI in the several rows of tanks. Motors M2R1, M2R2, M2R3 and M2R4 close the inlet valves VI. Motors M3R1, M3R2, M3R3 and M3R4 open the outlet valves VO. Motors M4R1, M4R2, M4R3 and M4R4 close the outlet valves VO.

The motors are arranged in a circuit to be described in connection with FIG. 9. The general arrangement is such that when a float reaches its uppermost position as indicated for tanks R2—F22 and R4—F22 in FIGS. 1 and 2, then the tank is full of water W. Projection 32 actuates arm 28 to close the circuit of one of inlet valve control motors M2R1, 2, 3 or 4 and effect closure of inlet valve VI. At the same time the outlet valve of the same tank is opened by motors M3R1, 2, 3 or 4, to permit water to be discharged from the tank. When a float reaches its lowermost position and the tank is empty as is the condition indicated for tanks R1—F22 and R3—F22, then projection 34 actuates arm 30 to close the circuit of one of motors M1R1, 2, 3 or 4 for opening the inlet valve VI. At the same time the associated valve VO of the same tank is closed by one of motors M4R1, 2, 3 or 4.

Each of the racks 36 has a series of teeth 50, from end to end of the rack. Spaced closely to the racks in the several rows are horizontal shafts S1–S4. In mesh with the teeth of each rack is a gear 54 freely rotatable on its shafts S1–S4; see FIGS. 3 and 4. Pivotally connected with one side of gear 54 is a pawl 68 held by a spring 55 in engagement with a ratchet wheel 60 keyed at 63 to one of shafts S1–S4, and held adjacent gear 54 by means of a set collar 64 circumposed about and secured to the shaft. Collar 65 holds gear 54 on the shaft while permitting the gear to rotate with respect to the shaft.

Figure 3:
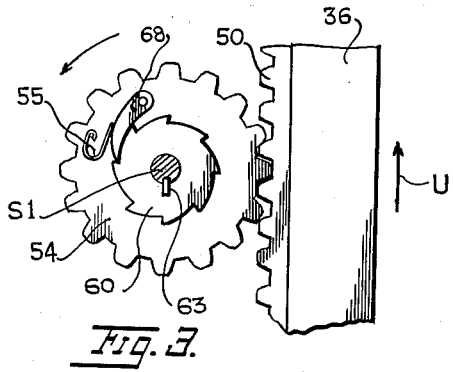
FIG. 3 is an enlarged fragmentary side elevational view of part of a rack gear and ratchet gear.
Figure 4:
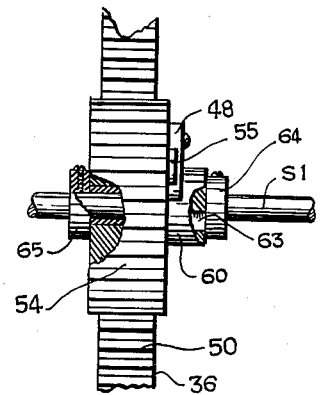
FIG. 4 is a front elevational view partially in section of the rack and ratchet gears, parts being broken away.

When the rack 36 moves upwardly, rotating the gear 54 in the direction shown by the arrow U in FIG. 3, rotatable movement will be imparted to the ratchet wheel 60 and shaft by engagement of the pawl 68 against the wheel. When, however, rack 36 moves downwardly, rotating gear 54 in an opposite direction, the pawl 68 will ride over the teeth of the ratchet wheel 60, and will, accordingly, not drive the ratchet wheel.

All of the shafts S1–S4 may be ganged together by a suitable gear means indicated schematically by dotted line G in FIG. 1 to drive a main shaft S on which is mounted a flywheel 80 for keeping the shaft rotating at a substantially constant speed.

Figure 9:
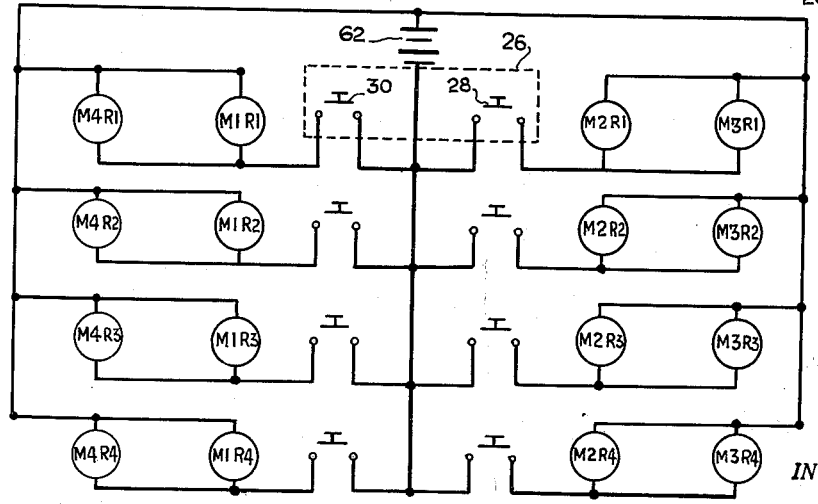
FIG. 9 is a schematic diagram of the several valve control motors and switches of the apparatus.

Referring now to FIG. 9, it will be understood that this figure illustrates the switches and motor connections for a single file of tanks. Each file of four tanks F1–F22 will have an identical circuit. In the circuit, each switch box 26 contains two push button switches controlled by switch arms 28 and 30, respectively. The switch arm 28 controls two motors M2R1, 2, 3 or 4 and M3R1, 2, 3 or 4 connected in parallel. The switch arm 30 controls the other two motors M1R1, 2, 3 or 4 and M4R1, 2, 3 or 4 connected in parallel. Since arm 28 is operated by the lower projection 32 on a rack gear when the tank is full, the inlet motor M2R1, 2, 3 or 4 will be energized to close the inlet valve VI while simultaneously therewith the motor M3R1, 2, 3 or 4 will be energized to open the outlet valve VO. When arm 30 is operated by the upper projection 34 as soon as a tank is empty, the switch will be closed to energize one of motors M1R1, 2, 3 or 4 for opening the inlet valve of the tank and simultaneously to energize one of motors M4R1, 2, 3 or 4 for closing the outlet valve while the tank fills with water.

Each two parallel motors are connected in parallel to battery 62. There are thus four motors associated with each tank, with two motors controlling each valve. One motor at each inlet valve is associated in parallel circuit with one motor at the outlet valve. The motors cooperate so that the tank inlet is open while the tank outlet is closed and vice versa.

In operation of the apparatus, assuming that inlet control valve VI of one tank 10 is open as shown in FIG. 2, while outlet valve VO is closed, then water W fills the tank and the float 40 rises, elevating rack 36. When rack 36 has risen to such an extent as to cause projection 32 to engage arm 28, the arm will close its push button switch energizing both parallel connected motors M2R1, 2, 3 or 4 and M3R1, 2, 3 or 4. The motors immediately operate to close inlet valve VI and open valve VO. The water then drains out of the tank. This causes float 40 to descend disengaging projection 32 from arm 28 and opening the circuits of motors M2R1, 2, 3 or 4 and M3R1, 2, 3 or 4. The float 40 descends with rack 36 until projection 34 reaches arm 30 whereupon the switch is operated to close the circuits of motors M1R1, 2, 3 or 4 and M4R1, 2, 3 or 4. These motors are energized to close the outlet valve VO and open the inlet valve VI. This will cause water to start entering the tank and raise the float and rack. As soon as the float begins to rise the switch arm 30 is released and filling of the tank continues, while the motors are stopped.

It is important to note that even though an outlet valve is open at any of the tanks in rows R1, R2 or R3, the water will not be discharged to the next lower tank in the file unless the inlet valve of the next lower tank is also open. Similarly, even though the inlet valve of any of the tanks in rows R2, R3 or R4 is open the water will not enter the tank unless the outlet valve of the next higher tank in the file is also open. This arrangement insures that the tanks fill and discharge in predetermined phase relationship. This phase relationship will be best understood by referring to FIG. 6 to which reference is now made.

Figure 6:
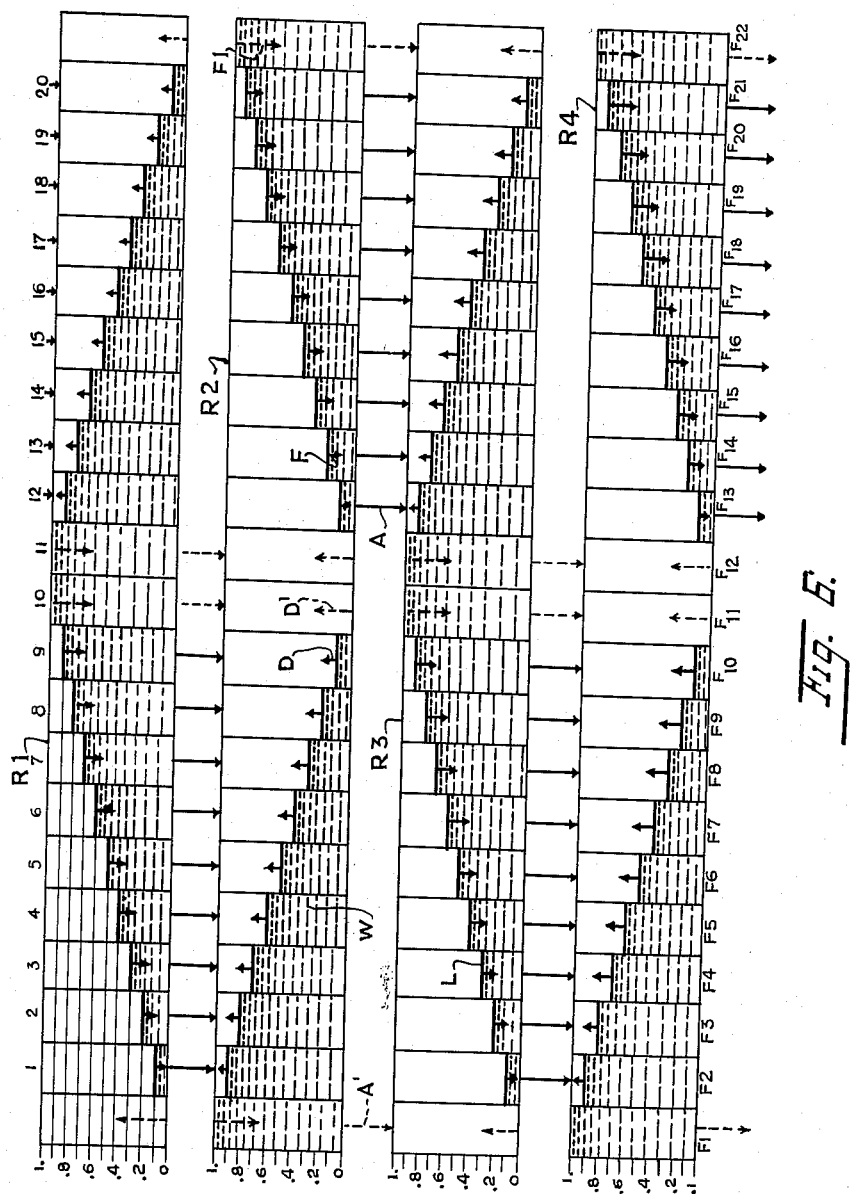
FIG. 6 is a diagram illustrating the phasing of the floats in the several tanks of the system.

In a typical installation illustrated diagrammatically in FIG. 6, solid horizontal lines L represent the positions of the floats in the tanks and correspondingly the level of the water in each tank. Thus, in row R1, the water level ranges from empty or zero in the first tank R1—F1, through .1 full in tank R1—F2, .2 full in tank R1—F3, and so on by tenths to wholly full in tanks R1—F11 and R1—F12; then the levels of water are lower by tenths from .9 full in tank R1—F13 to zero or empty in tanks R1—F22.

In row R2, the tanks from left to right range from full in tank R2—F1 downward in water level by tenths to empty in tanks R2—F11 and R2—F12, then upward by tenths from one-tenth full in tank R2—F13 to full in tank R2—F22.

In rows R3 and R4 the water levels are the same as in the tanks of the same files in rows R1 and R2 respectively.

The solid line arrows A under the several rows indicate that the water is flowing from the upper tank in the file to the next lower tank in the file. The solid line arrows D and F indicate the water level is falling and rising respectively. Dotted line arrows D' and F' indicate the water level is about to rise or fall respectively. Dotted line arrows A' indicate the water is about to discharge into the next lower tank in the file.

It will be apparent from an inspection of FIG. 6 that the flow of water in each tank in a row is differently phased in a complete cycle from full through empty to full again. Thus about half of the tanks in each row are always being filled and half are always being emptied. As a result, half of the floats are always rising and driving the shafts S1–S4 while the other half of the floats are descending and their racks 36 are free of the gears 54. Thus a constant rotary motion is imparted to the main shaft S.

It will be noted, furthermore, that the floats in the several tanks are so disposed that the water level in each higher tank is 180° out of phase with the water level in the next lower tank in the file. Thus, while each higher tank is discharging water the next lower tank is receiving water therefrom, and while each higher tank is filling with water, the next lower tank in the file is discharging water.

If desired, more or less than twenty-two files of tanks may be used and more or less than four rows of tanks may be used. The system operates automatically once it is set up in proper phase relationship in the tanks.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A water power conversion system, comprising an assembly of tanks, said tanks being arranged in an even number of at least two horizontal rows and an even number of at least four vertical files, each row of tanks being supported on a different level, the tanks in each row being supported on a common level, each of said files including one tank in each row on a different level, the tanks in each file being connected to conduits so that each higher tank discharges water into a lower tank in the file, valve means controlling the inlet of water to each tank and the outlet of water from the tank, a float disposed in each tank, power take-off means operatively connected to each float for power take-off when the float rises in the tank as water enters the tank, and a water supply conduit connected in common to all the inlets of all the tanks in the uppermost row so that some of the tanks in the uppermost row are always receiving water from the conduit, the floats in the tanks of each row being located a predetermined distance apart at all times while the floats rise and fall in the tanks, so that each float completes a cycle of descent and ascent in the tank at a different time from the time of completion of the cycle of each other float in the row, the floats in the files of tanks located in the alternate ones of the rows being 180° out of phase in their cycles of descent and ascent from the floats in the same files located in the remaining rows, whereby some of the tanks in each row are always filling with water while the other tanks in the same row are discharging water, and whereby when each higher tank in a file is discharging water, the next lower tank in the file is receiving water therefrom, and while each higher tank in a file is receiving water, the next lower tank in the file is discharging water, so that said power take-off means is driven continuously at uniform speed by continuously applied mechanical power as water continuously enters some of the tanks in the uppermost row and continuously is discharged from some other tanks in the lowermost row.

2. A water power conversion system, comprising an assembly of tanks, said tanks being arranged in an even number of at least two horizontal rows and an even number of at least four vertical files, each row of tanks being supported on a different level, the tanks in each row being supported on a common level, each of said files including one tank in each row on a different level, the tanks in each file being connected to conduits so that each higher tank discharges water into a lower tank in the file, valve means controlling the inlet of water to each tank and the outlet of water from the tank, a float disposed in each tank, power take-off means operatively connected to each float for power take-off when the float rises in the tank as water enters the tank, and a water supply conduit connected in common to all the inlets of all the tanks in the uppermost row so that some of the tanks in the uppermost row are always receiving water from the conduit, the floats in the tanks of each row being located a predetermined distance apart at all times while the floats rise and fall in the tanks, so that each float completes a cycle of descent and ascent in the tank at a different time from the time of completion of the cycle of each other float in the row, the floats in the files of tanks located in the alternate ones of the rows being 180° out of phase in their cycles of descent and ascent from the floats in the same files located in the remaining rows, so that when each higher tank in a file is discharging water, the next lower tank in the file is receiving water therefrom, and while each higher tank in a file is receiving water, the next lower tank in the file is discharging water, said valve means being connected to open the inlet of a tank and close its outlet when the tank is empty and to close the inlet and open the outlet when the tank is full of water, whereby some of the tanks in each row are always filling with water while the other tanks in the same row are discharging water, so that said power take-off means is driven continuously at uniform speed by continuously applied mechanical power as water continuously enters some of the tanks in the uppermost row and continuously is discharged from some other tanks in the lowermost row.

3. A water power conversion system, comprising an assembly of tanks, said tanks being arranged in an even number of at least two vertically spaced horizontal rows and an even number of at least four vertical files, so that there are at least four tanks in each row, the upper tanks in each file each having an outlet connected by a conduit to an inlet of a lower tank in the same file, a source of water connected to all inlets of the uppermost row of tanks, a plurality of inlet and outlet valves, each inlet valve controlling reception of water by only a single tank, each outlet valve controlling discharge of water from only a single tank, a float disposed for vertical movement in each tank, the floats in all the tanks rising and falling continuously as water enters and leaves the tanks respectively, the floats in one-half of the tanks in all horizontal rows being located at predetermined equal vertical distances apart at all times while the floats rise and fall in the tanks, the floats in the other half of the tanks in all horizontal rows all being located equal vertical distances apart at all times and falling or rising while the floats in the one half of the tanks are correspondingly rising or falling respectively, at least two floats in each horizontal row always being on an equal level with one of the two floats rising while the other float of the two floats is falling, a power takeoff shaft, and means operatively connecting each float to the power takeoff shaft, whereby power of constant magnitude is continuously applied to the power takeoff shaft by the floats in one half of the tanks.

4. A water power conversion system according to claim 3, wherein all of the inlet and outlet valves are electrically operated, switches connected in circuit with the valves respectively, and switch actuation means carried by the floats for actuating the outlet and inlet valves at upper and lower limits of vertical travel of the floats respectively.

References Cited in the file of this patent

UNITED STATES PATENTS

| | | |
|---|---|---|
| 136,088 | Morton | Feb. 18, 1873 |
| 459,280 | Garrett | Sept. 8, 1891 |
| 512,606 | Teal | Jan. 30, 1894 |
| 939,506 | Hubmann | Nov. 9, 1909 |
| 1,209,975 | Knowlton | Dec. 26, 1916 |
| 1,451,580 | Lindenberg | Apr. 10, 1923 |
| 1,557,290 | Ippolito | Oct. 13, 1925 |

FOREIGN PATENTS

| | | |
|---|---|---|
| 17,784 | Great Britain | Sept. 2, 1899 |